United States Patent
Kato

(10) Patent No.: US 9,894,827 B2
(45) Date of Patent: Feb. 20, 2018

(54) WORKING VEHICLE

(71) Applicant: YANMAR CO., LTD., Osaka-shi, Osaka (JP)

(72) Inventor: Katsunori Kato, Osaka (JP)

(73) Assignee: YANMAR CO., LTD., Osaka-Shi, Osaka (JP)

( * ) Notice: Subject to any disclaimer, the term of this patent is extended or adjusted under 35 U.S.C. 154(b) by 301 days.

(21) Appl. No.: 14/653,170

(22) PCT Filed: Dec. 16, 2013

(86) PCT No.: PCT/JP2013/083621
§ 371 (c)(1),
(2) Date: Jun. 17, 2015

(87) PCT Pub. No.: WO2014/098028
PCT Pub. Date: Jun. 26, 2014

(65) Prior Publication Data
US 2015/0327426 A1    Nov. 19, 2015

(30) Foreign Application Priority Data

Dec. 17, 2012 (JP) ................ 2012-274605
Dec. 18, 2012 (JP) ................ 2012-276140
Dec. 18, 2012 (JP) ................ 2012-276141

(51) Int. Cl.
*B60K 25/00* (2006.01)
*B60K 25/06* (2006.01)
(Continued)

(52) U.S. Cl.
CPC .............. *A01B 71/02* (2013.01); *B60K 17/28* (2013.01); *F16D 28/00* (2013.01); *A01D 34/828* (2013.01);
(Continued)

(58) Field of Classification Search
None
See application file for complete search history.

(56) References Cited

U.S. PATENT DOCUMENTS 6,129,187 A    10/2000  Bellanger et al.
7,302,789 B2 * 12/2007  Eavenson, Sr. ........ A01D 34/76
                                                       180/6.48
(Continued)

FOREIGN PATENT DOCUMENTS

JP    S5983303 U    6/1984
JP    H01256303 A  10/1989
(Continued)

OTHER PUBLICATIONS

International Search Report corresponding to Application No. PCT/JP2013/083621; dated Mar. 18, 2014, with English translation.

*Primary Examiner* — Robert A Siconolfi
*Assistant Examiner* — Ryan Dodd
(74) *Attorney, Agent, or Firm* — Cantor Colburn LLP

(57) ABSTRACT

The purpose is to provide a working vehicle such that, when a reverse switch coupler is detached, or when a wire connecting a reverse switch to a control device is disconnected, driving of a PTO shaft can be reliably prevented and reliability of the reverse switch can be improved. In a tractor, a reverse switch includes a normally closed type first contact, and a normally open type second contact that is switched in association with the first contact. When an input voltage from the first contact is higher than a set voltage, and when the input voltage from the first contact is lower than the set voltage and an input voltage from the second contact is equal to or lower than the set voltage, a control device controls the actuator such that the PTO clutch is disconnected.

6 Claims, 10 Drawing Sheets

(51) Int. Cl.
*B60K 28/00* (2006.01)
*A01B 71/02* (2006.01)
*F16D 28/00* (2006.01)
*B60K 17/28* (2006.01)
*B60W 50/029* (2012.01)
*A01D 69/08* (2006.01)
*B60W 30/18* (2012.01)
*A01D 34/82* (2006.01)
*B60W 30/188* (2012.01)
*B60W 50/02* (2012.01)

(52) U.S. Cl.
CPC ............ *A01D 69/08* (2013.01); *B60K 25/06* (2013.01); *B60K 28/00* (2013.01); *B60W 30/18036* (2013.01); *B60W 30/1888* (2013.01); *B60W 50/02* (2013.01); *B60W 2050/0295* (2013.01)

(56) References Cited

U.S. PATENT DOCUMENTS

| | | |
|---|---|---|
| 2002/0000759 A1 | 1/2002 | Harada et al. |
| 2004/0026138 A1* | 2/2004 | Shoemaker ............ B60K 25/06 180/53.6 |
| 2004/0201286 A1* | 10/2004 | Harvey ................ A01D 34/828 307/326 |
| 2006/0201121 A1* | 9/2006 | Straka .................. A01D 34/828 56/10.2 R |
| 2014/0069216 A1* | 3/2014 | Huebner ................ B60K 25/06 74/15.82 |
| 2015/0257336 A1* | 9/2015 | Dwyer .................. H01H 13/52 701/50 |

FOREIGN PATENT DOCUMENTS

| | | |
|---|---|---|
| JP | H0723601 A | 1/1995 |
| JP | H09168313 A | 6/1997 |
| JP | H10226242 A | 8/1998 |
| JP | 2002012051 A | 1/2002 |
| JP | 2003219707 A | 8/2003 |
| JP | 2006296261 A | 11/2006 |
| JP | 2010172197 A | 8/2010 |
| JP | 2010172232 A | 8/2010 |
| JP | 2012157340 A | 8/2012 |

\* cited by examiner

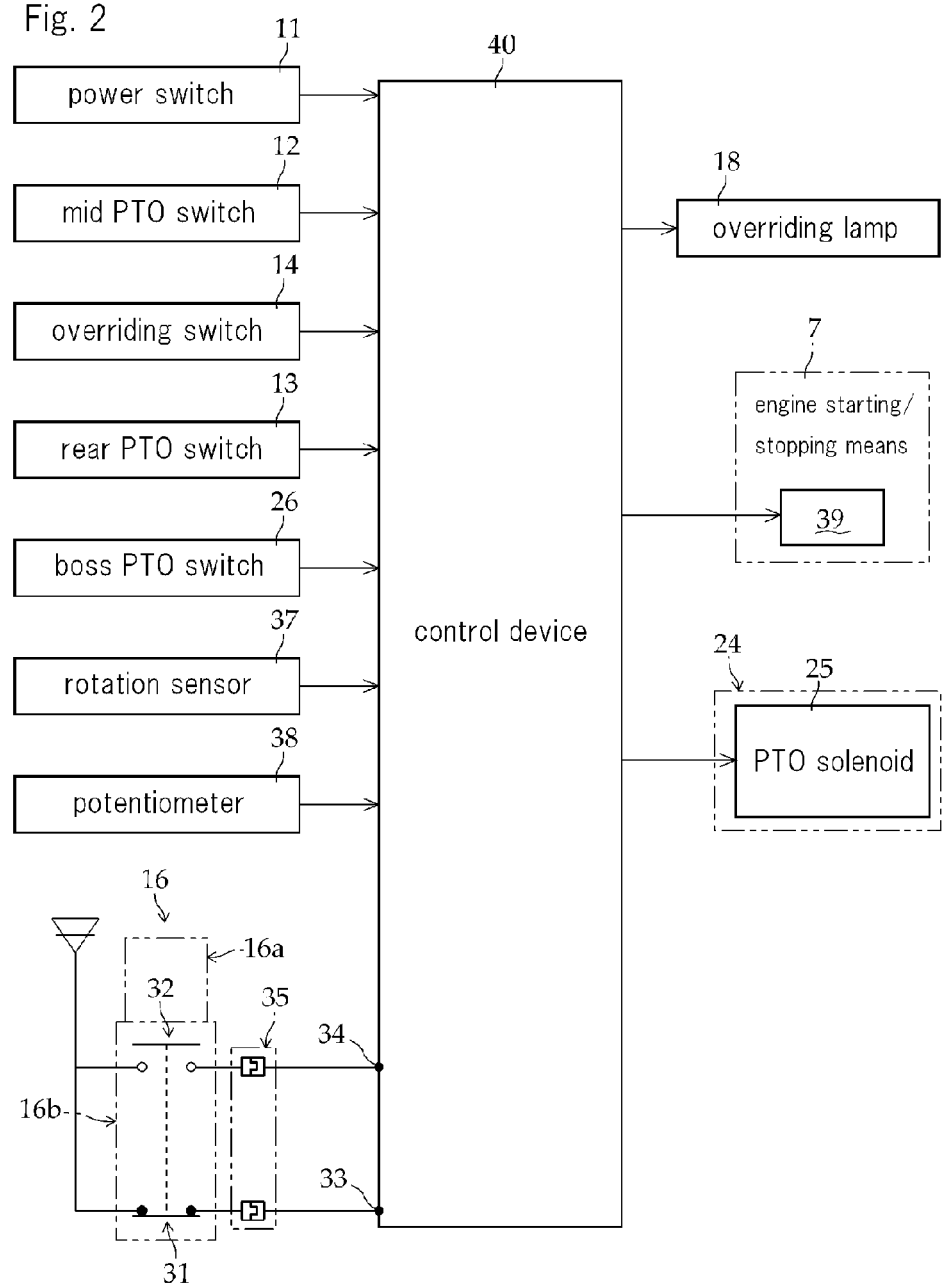

WORKING VEHICLE

CROSS REFERENCE TO RELATED APPLICATIONS

This is the U.S. national stage of application No. PCT/JP2013/083621, filed on Dec. 16, 2013. Priority under 35 U.S.C. § 119(a) and 35 U.S.C. § 365(b) is claimed from Japanese Application No. 2012-274605, filed Dec. 17, 2012; Japanese Application No. 2012-276140, filed Dec. 18, 2012; and Japanese Application No. 2012-276141, filed Dec. 18, 2012, the disclosures of which are also incorporated herein by reference.

TECHNICAL FIELD

The present invention relates to a working vehicle in which a working machine is connected to a vehicle body and the working machine is driven via a power-take off ("PTO") shaft.

BACKGROUND ART

Conventionally, a working vehicle is known in which a working machine is connected to a vehicle body and the working machine is driven via a PTO shaft. For example, an agricultural tractor described in the Patent Literature 1 (the Japanese Patent Laid Open Gazette 2010-172197) is so.

In the agricultural tractor described in the Patent Literature 1, the working machine (rotary tilling device) is connected to a rear part of the vehicle body and the working machine can be via the PTO shaft. In the agricultural tractor described in the Patent Literature 1 (the Japanese Patent Laid Open Gazette 2010-172197), a vehicle operation instrument (forward/rearward traveling switch lever) which is operated so as to make the vehicle body travel rearward is provided. In a basal end part of the vehicle operation instrument, a reverse switch (back switch) detecting the operation of the vehicle operation instrument to the rearward traveling side is provided. In the tractor configured as the above, for preventing drive of the PTO shaft at the time of rearward traveling of the vehicle body, during the operation of the vehicle operation instrument to the rearward traveling side is detected by the reverse switch, in principle, a control device performs control so as not to transmit power from an engine to the PTO shaft.

The reverse switch has a circuit in which a contact which is normally opened type is arranged and attached to the vehicle body so that when the vehicle operation instrument is operated to the rearward traveling side, the contact is closed, and when the vehicle operation instrument is not operated to the rearward traveling side, the contact is opened.

PRIOR ART REFERENCE

Patent Literature

Patent Literature 1: the Japanese Patent Laid Open Gazette 2010-172197

DISCLOSURE OF INVENTION

Problems to be Solved by the Invention

However, in the agricultural tractor described in the Patent Literature 1, an operator may remove a coupler of the reverse switch because of trouble that the PTO shaft cannot be drive at the time of rearward traveling of the vehicle body. Disconnection may occur in the circuit of the reverse switch. When such abnormality occurs in the reverse switch, the circuit in which the contact is arranged is held to be opened. However, in the above configuration, whether the reason of the opening state of the circuit is the abnormality of the reverse switch or the operation of the vehicle operation instrument to a forward traveling side (or a neutral position) cannot be distinguished. Accordingly, when such abnormality occurs in the reverse switch, it is difficult to prevent certainly the drive of the PTO shaft.

In consideration of the above problem, the purpose of the present invention is to prevent drive of a PTO shaft certainly and improve reliability of a reverse switch when a coupler of the reverse switch is removed or when wiring connecting the reverse switch to a control device is disconnected.

Means for Solving the Problems

According to the present invention, a working vehicle includes an actuator switching transmission and interruption of a PTO clutch, and a reverse switch detecting rearward traveling operation. The reverse switch has a first contact which is normally closed type and a second contact which is normally opened type and switched interlockingly with the first contact, and these contacts are connected to a control device so that the first contact is closed and the second contact is opened while rearward traveling operation is performed and the first contact is opened and the second contact is closed while the rearward traveling operation is not performed. When an input voltage from the first contact is higher than a set voltage, or when the input voltage from the first contact is not higher than the set voltage and an input voltage from the second contact is not higher than the set voltage, the control device controls the actuator so as to shift the PTO clutch to an interruption state.

According to the present invention, the working vehicle according to claim 1, further includes a PTO switch selecting a transmission state or the interruption state of the PTO clutch, and an overriding switch turned ON so as to enable drive of the PTO shaft at the time of rearward traveling. When the input voltage from the first contact is higher than the set voltage and both the PTO switch and the overriding switch are turned ON, the control device controls the actuator so as to shift the PTO clutch to the transmission state.

According to the present invention, in the working vehicle according to claim 1 or 2, when the input voltage from the first contact is not detected to be not higher than the set voltage until a predetermined abnormality detection time from turning ON of a power switch, or when the input voltage from the second contact is not detected to be higher than the set voltage until the predetermined abnormality detection time from turning ON of the power switch, the control device judges that abnormality occurs in the reverse switch, and controls the actuator so as to shift the PTO clutch to the interruption state.

According to the present invention, in the working vehicle according to claim 3, when the abnormality is judged to occur in the reverse switch, the power switch is turned OFF once and turned ON again, and after the turning ON of the power switch for the predetermined abnormality detection time, only when the input voltage from the first contact is detected to be not higher than the set voltage and the input voltage from the second contact is detected to be higher than the set voltage, the PTO clutch can be shifted to the transmission state after the predetermined abnormality detection time.

Effect of the Invention

The present invention brings the following effects.

According to the present invention, when the operation of the vehicle operation instrument to the rearward traveling side is detected, when the coupler of the reverse switch removed, or when the wiring connecting the reverse switch to the control device is broken, the PTO clutch is not shifted to the transmission state. Accordingly, at the time of rearward traveling of the vehicle body, or at the time of abnormality of the reverse switch, the drive of the PTO shaft can be prevented certainly, whereby reliability of the reverse switch can be improved. Safety can be improved.

According to the present invention, only when the PTO switch is turned ON and the overriding switch is turned ON, the PTO shaft can be driven at the time of rearward traveling of the vehicle body, whereby safety can be improved.

According to the present invention, when a user drops the reverse switch from the attachment frame or removes the coupler of the reverse switch so as to avoid intentionally detection of the rearward traveling by the reverse switch, the PTO clutch cannot be shifted to the transmission state. Accordingly, when abnormality occurs in the reverse switch, the drive of the PTO shaft can be prevented certainly, whereby reliability of the reverse switch can be improved.

Concretely, when a user turns the power switch ON while the coupler of the reverse switch is not removed and the reverse switch is dropped from the attachment frame for attachment to the vehicle frame, the detection voltage of the first connection part is held to be higher than the predetermined voltage and the detection voltage of the second connection part is held to be not higher than the predetermined voltage, whereby the PTO clutch is shifted to the interruption state.

When a user turns the power switch ON while the coupler of the reverse switch is removed, the detection voltage of the second connection part is held to be not higher than the predetermined voltage, whereby the PTO clutch is shifted to the interruption state.

Accordingly, when abnormality occurs in the reverse switch, the drive of the PTO shaft can be prevented certainly, whereby reliability of the reverse switch can be improved.

According to the present invention, when abnormality occurs in the reverse switch, a user can be urged to stop the engine once so as to correct the abnormality of the reverse switch.

BRIEF DESCRIPTION OF DRAWINGS

FIG. 2 is a block diagram of a control mechanism of the tractor.
FIG. 3A shows a position at which a projection amount is the minimum,
FIG. 3B shows a position at which the projection amount is in the middle of the minimum and the maximum,
and FIG. 3C shows a position at which the projection amount is the maximum.
FIG. 4A shows a state at which a vehicle operation instrument is not operated to a rearward traveling side,
and FIG. 4B shows a state at which the vehicle operation instrument is operated to the rearward traveling side.
FIG. 6B is a drawing of a state at which the reverse switch is fallen out from an attachment frame.

DETAILED DESCRIPTION OF THE INVENTION

Firstly, a first embodiment of an agricultural tractor 1 which is an example of a working vehicle is explained.

Figure 1:
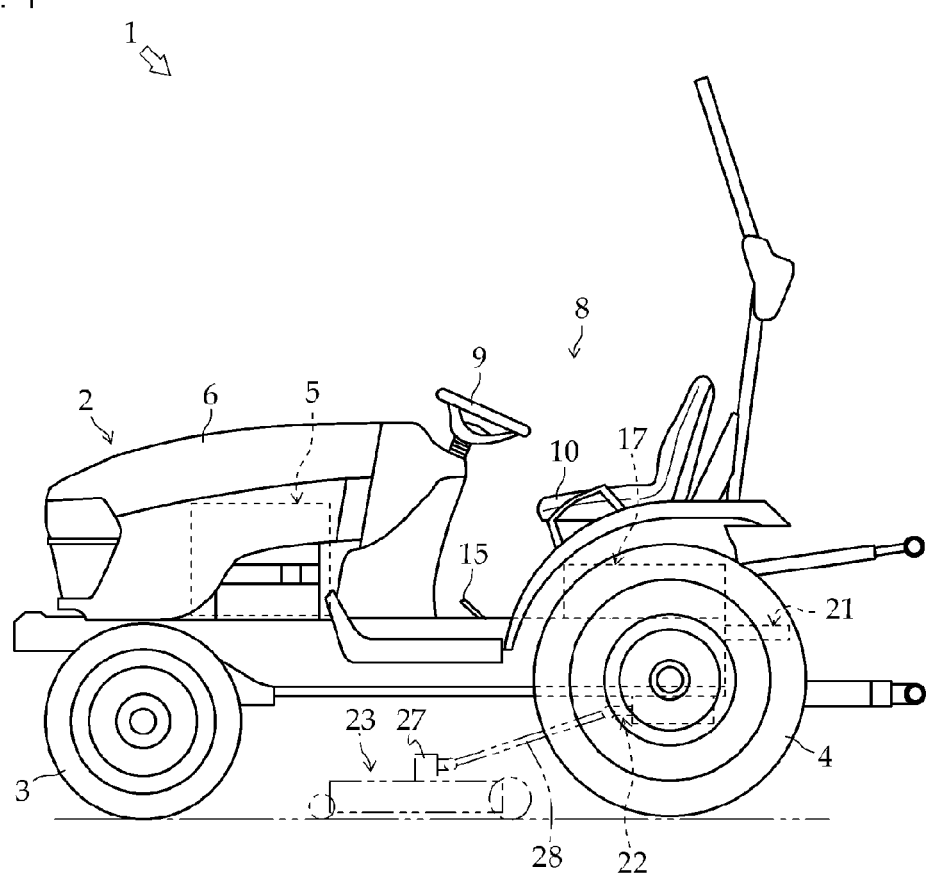
FIG. 1 is a left side view of an agricultural tractor.

As shown in FIG. 1, the tractor 1 is a working vehicle which can transmit power via a PTO shaft to a working machine connected to a vehicle body. Front wheels 3 and rear wheels 4 are arranged respectively at front and rear parts of the vehicle body 2 of the tractor 1. In the front part of the vehicle body 2, an engine 5 which is a power source of the tractor 1 is mounted, and the engine 5 is covered by a bonnet 6. As shown in FIG. 2, an engine starting/stopping means 7 is provided in the engine 5 so as to start and stop the engine 5. Concretely, the engine starting/stopping means 7 is configured by a solenoid, which is an actuator for opening and closing a fuel supply valve provided in a fuel supply passage to the engine 5, or the like. The engine starting/stopping means 7 is connected electrically to a control device 40.

As shown in FIG. 1, in the rear part of the vehicle body 2, an operation part 8 is provided. In the operation part 8, a steering wheel 9 is provided, and behind the steering wheel 9, a seat 10 on which a user (operator) sits is provided. Near the steering wheel 9, a power switch 11, a mid PTO switch 12, a rear PTO switch 13, a boss PTO switch 26, an overriding switch 14 and the like are provided (see FIG. 2). Below the steering wheel 9, a vehicle operation instrument 15 (see FIG. 1) and a reverse switch 16 are provided.

A clutch housing is disposed behind the engine 5, and a transmission casing 17 is disposed behind the clutch housing. Power of the engine 5 is transmitted via a main clutch housed in the clutch housing and a speed change device housed in the transmission casing 17 to the rear wheels 4, and transmitted via a four-wheel drive/front wheel acceleration drive switching mechanism to the front wheels 3.

In a rear surface of the transmission casing 17, a rear PTO shaft 21 is provided so as to project rearward. In a bottom of the transmission casing 17, a mid PTO shaft 22 projecting forward is disposed. The rear PTO shaft 21 transmits the power from the engine 5 to a working machine (not shown) connected to the rear part of the vehicle body 2 such as crushing working machine or a rotary working machine. The mid PTO shaft 22 transmits the power from the engine 5 to the working machine such as a mower working machine 23 for grass cutting provided below a center of the vehicle body 2. Then, the power from the engine 5 is transmitted via a main driving shaft housed in the clutch housing and the like to the rear PTO shaft 21 and the mid PTO shaft 22.

In a middle part of a power transmission route from the main driving shaft to the mid PTO shaft 22, that is, between the engine 5 and the mid PTO shaft 22, a mid PTO clutch 24 is arranged (see FIG. 2). The mid PTO clutch 24 is configured by an electromagnetic clutch for example, and transmission and interruption of the power to the mid PTO shaft 22 is switched by a PTO solenoid 25. Namely, by supplying electric power to the PTO solenoid 25, the mid PTO clutch 24 is shifted to a transmission state ("engagement"), and by stopping supply of electric power to the PTO solenoid 25, the mid PTO clutch 24 is shifted to an interruption state ("disengagement"). The mid PTO shaft 22 is an embodiment of a "PTO shaft" according to the present invention, the mid PTO clutch 24 is an embodiment of a "PTO clutch" according to the present invention, and the PTO solenoid 25 is an embodiment of an "actuator" according to the present invention. The PTO solenoid 25 is connected electrically to the control device 40.

Similarly, in a middle part of a power transmission route from the main driving shaft to the rear PTO shaft 21, that is, between the engine 5 and the rear PTO shaft 21, a rear PTO clutch (not shown) is arranged.

The "PTO clutch" is not limited to an electromagnetic clutch like this embodiment and may alternatively be a multiplate clutch or a hydraulic clutch for example. The "actuator" is not limited to a solenoid like this embodiment and may alternatively be another electric actuator or the like.

The power switch 11 is a power switch of the tractor and configured by a key switch or the like. The power switch 11 is connected electrically to the control device 40.

The mid PTO switch 12 is an embodiment of a "PTO switch" according to the present invention, and is an operation instrument for selecting artificially one of the transmission state or the interruption state of the mid PTO clutch 24. The mid PTO switch 12 is connected electrically to the control device 40. An ON state of the mid PTO switch 12 corresponds to the transmission state ("engagement") of the mid PTO clutch 24, and an OFF state of the mid PTO switch 12 corresponds to the interruption state ("disengagement") of the mid PTO clutch 24.

Figure 3A:
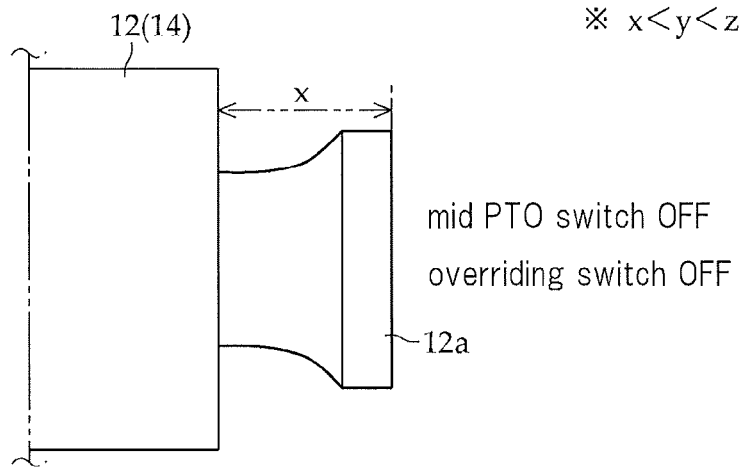
FIGS. 3A-3C are drawing showing three positions of a mid PTO switch which also serves as an overriding switch.
Figure 3B:
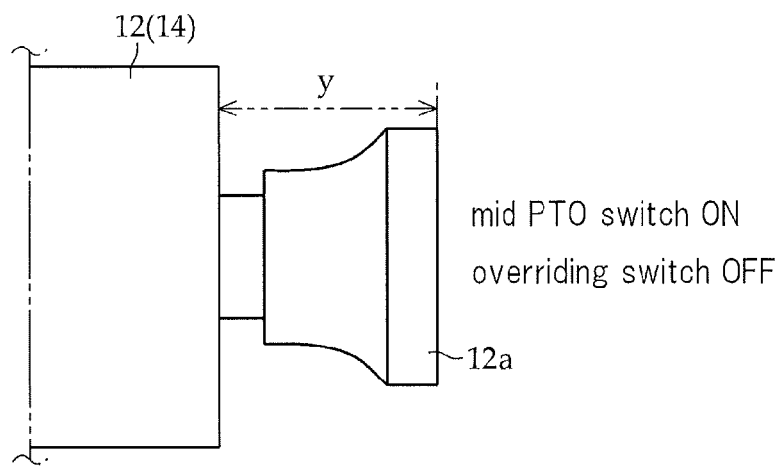
Figure 3C:
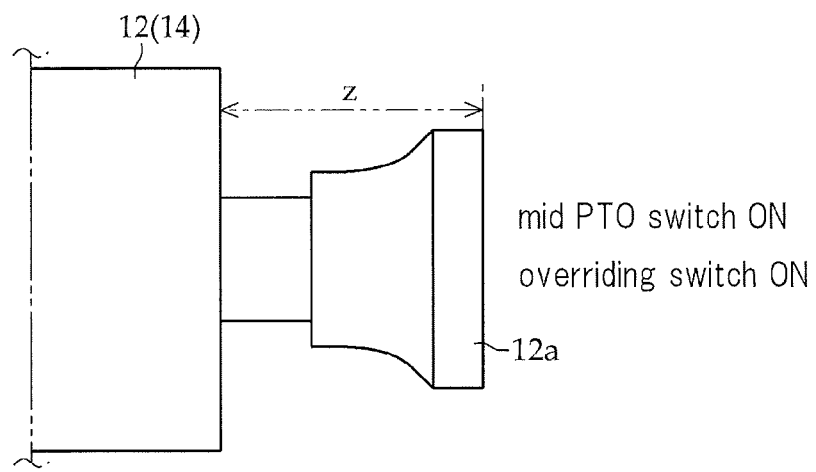

As shown in FIGS. 3A, 3B, and 3C the mid PTO switch 12 and the overriding switch 14 of this embodiment can be turned ON/OFF with one operation instrument 12a. A user turns ON the overriding switch 14 for enabling drive of the mid PTO shaft 22 at the time of rearward traveling of the vehicle body 2.

Concretely, as shown in FIGS. 3A-3C, a projection amount of the operation instrument 12a of the mid PTO switch 12 and the overriding switch 14 of this embodiment can be switched to three stages (x<y<z). Namely, the operation instrument 12a can be switched to three positions. At a position at which the projection amount is the minimum (x) (see FIG. 3A), the mid PTO switch 12 is turned OFF and the overriding switch 14 is turned OFF. At a position at which the projection amount is the maximum (z) (see FIG. 3C), the mid PTO switch 12 is turned ON and the overriding switch 14 is turned ON. At a position at which the projection amount is a middle between the minimum and the maximum (y) (see FIG. 3B), the mid PTO switch 12 is turned ON and the overriding switch 14 is turned OFF. The "overriding switch" according to the present invention may alternatively be provided separately from the mid PTO switch 12 so as to operate the switches separately.

An overriding lamp 18 is switched on until the overriding switch 14 is turned ON. The overriding lamp 18 is connected electrically to the control device 40.

The rear PTO switch 13 is an operation instrument for selecting artificially one of the transmission state or the interruption state of the rear PTO clutch. The rear PTO switch 13 is connected electrically to the control device 40. An ON state of the rear PTO switch 13 corresponds to the transmission state ("engagement") of the rear PTO clutch, and an OFF state of the rear PTO switch 13 corresponds to the interruption state ("disengagement") of the rear PTO clutch.

The vehicle operation instrument 15 shown in FIG. 1 is an operation instrument which is operated artificially by an operator at the time of making the vehicle body 2 travel. The vehicle operation instrument 15 of this embodiment is configured by a pedal. In the tractor 1, the vehicle body 2 can be made travel forward and rearward with the vehicle operation instrument 15. The vehicle body 2 travels forward by operating the vehicle operation instrument 15 to a forward traveling side, the vehicle body 2 travels rearward by operating the vehicle operation instrument 15 to a rearward traveling side, and the vehicle body 2 is stopped by operating the vehicle operation instrument 15 to a neutral position. The "vehicle operation instrument" is not limited to a member like a pedal and may alternatively be configured by a lever or the like. A potentiometer 38 detecting a rotation angle of the vehicle operation instrument 15 is connected to the vehicle operation instrument 15.

Figure 4A:
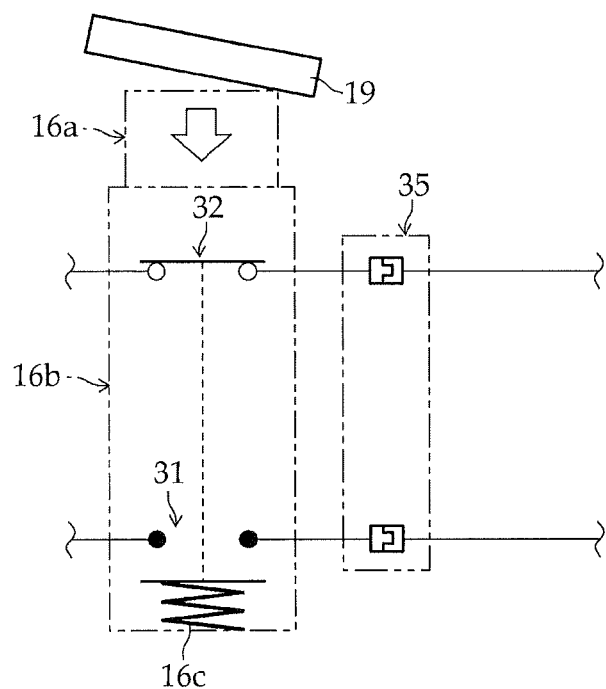
FIGS. 4A-4B is a schematic drawing of a reverse switch.
Figure 4B:
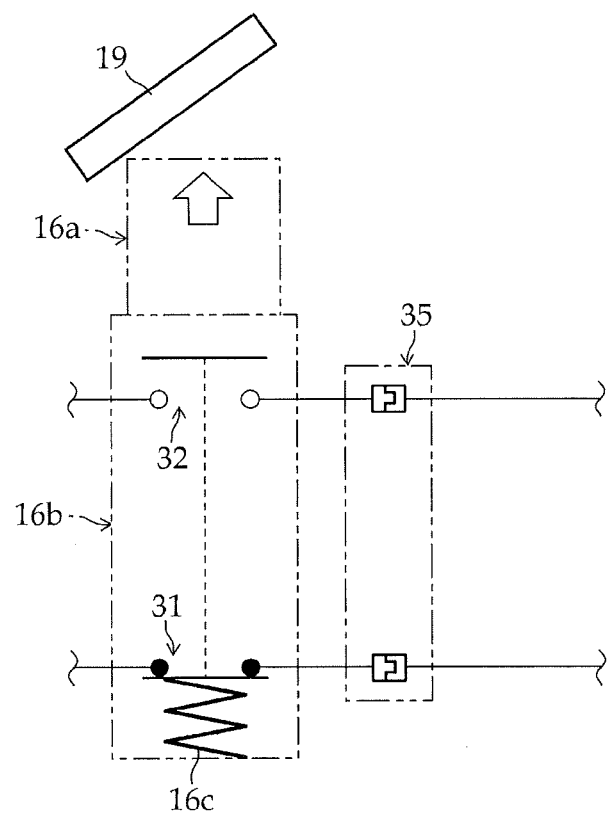

The vehicle operation instrument 15 is interlocked via a link mechanism with a plate 19 shown in FIGS. 4A and 4B. The plate 19 is arranged near an operation projection part 16a of the reverse switch 16.

The reverse switch 16 detects the rearward traveling operation of the vehicle operation instrument 15. The reverse switch 16 is explained concretely referring to FIGS. 4A and 4B. Entirely, the reverse switch 16 is a push-type switch, and inside thereof, a first contact 31 which is normally closed type and a second contact 32 which is normally opened type are provided. The first contact 31 and the second contact 32 are arranged in parallel and switched interlockingly. One of sides (output side) of each of the first contact 31 and the second contact 32 is connected electrically via a coupler 35 to the control device 40 (see FIG. 2). In more detail, one of sides of the first contact 31 is connected to a first connection part 33 of the control device 40. One of sides of the second contact 32 is connected to a second connection part 34 of the control device 40. The other side (input side) of each of the first contact 31 and the second contact 32 is connected to a power circuit and applied thereto with a predetermined voltage. The other side may alternatively be connected to a ground.

The reverse switch 16 is attached to an attachment frame (not shown) to the vehicle body 2. While being attached to the attachment frame, the operation projection part 16a projected from a body part 16b of the reverse switch 16 can be pushed in and projected by rotating the plate 19. Namely, when the vehicle operation instrument 15 is not operated to the rearward traveling side (at the time of forward traveling or neutral), the operation projection part 16a of the reverse switch 16 is pushed into the body part 16b by the plate 19 so that the first contact 31 is opened and the second contact 32 is closed (see FIG. 4A). On the other hand, when the vehicle operation instrument 15 is operated to the rearward traveling side (at the time of rearward traveling), the plate 19 is separated from the operation projection part 16a and the operation projection part 16a is pushed out by a biasing member 16c provided inside the body part 16b so that the operation projection part 16a is at the state of not pushed into the body part 16b, whereby the first contact 31 is closed and the second contact 32 is opened (see FIG. 4B). The first connection part 33 and the second connection part 34 of the control device 40 can detect voltages applied thereto respectively.

The control device 40 is mounted on the tractor 1. The control device 40 controls the engine starting/stopping means 7 and controls the PTO solenoid 25 as the actuator. The control device 40 is connected electrically to the engine starting/stopping means 7, the PTO solenoid 25, the overriding lamp 18, the power switch 11, the mid PTO switch 12, the overriding switch 14, the rear PTO switch 13, the reverse switch 16 and the potentiometer 38.

Figure 5:
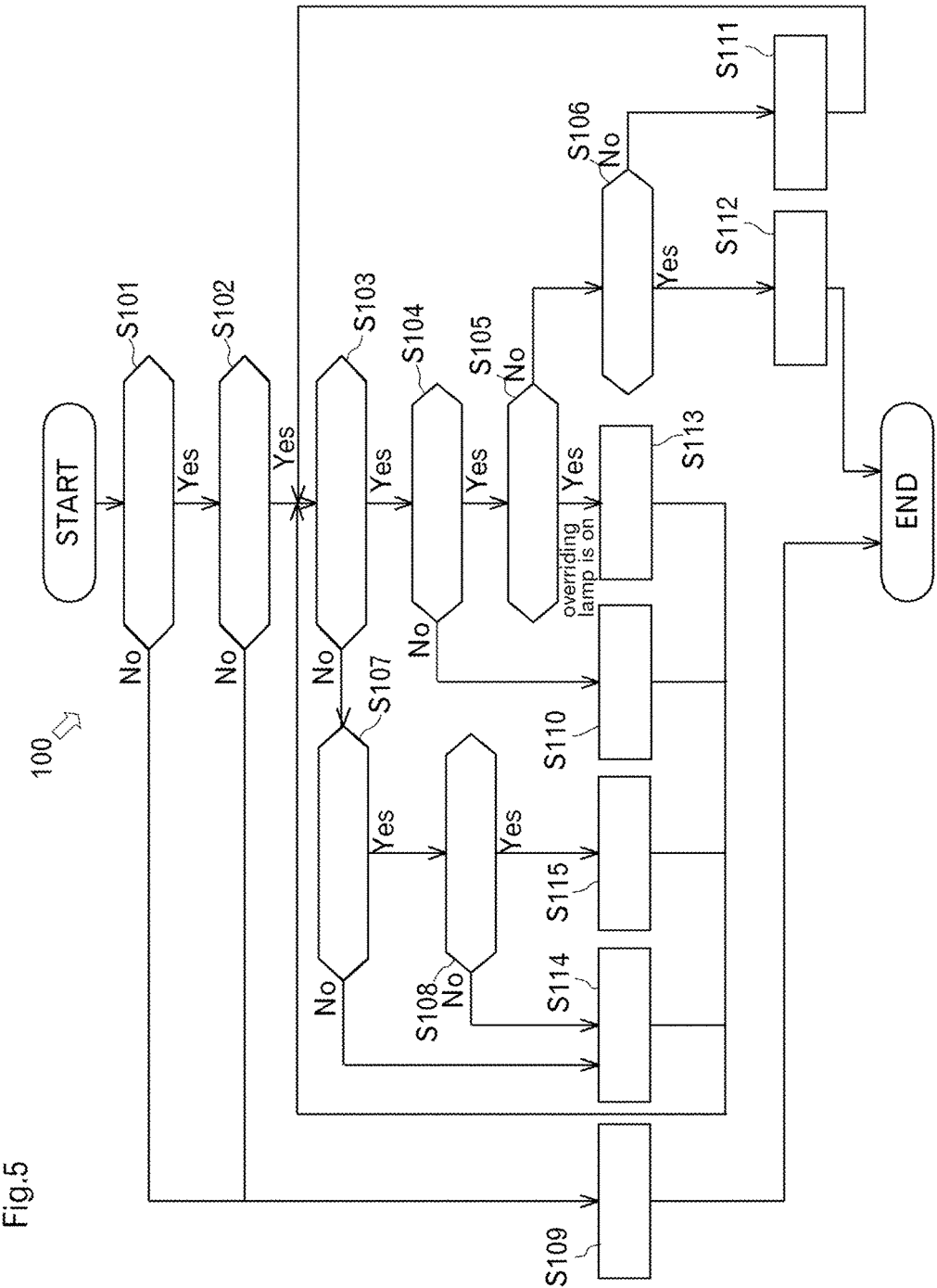
FIG. 5 is a flow chart of a control flow.

A control flow 100 executed by the control device 40 is explained referring to FIG. 5. As shown in FIG. 5, the control flow 100 is configured by steps S101 to S115.

When the power switch 11 is turned ON and the engine 5 is started, the control device 40 starts the control flow 100 (START). Firstly, the control device 40 judges whether an input voltage from the first contact 31 is not higher than a set voltage or not, that is, a detection voltage of the first connection part 33 is detected to be 0V for example or not until a predetermined abnormality detection time from turning ON of the power switch 11 (step S101). The "predetermined abnormality detection time" may be 20 seconds for example, but not limited thereto and can be set optionally. Until the predetermined abnormality detection time, when the detection voltage of the first connection part 33 is continuously a predetermined voltage (for example, 12V), the control device 40 judges that abnormality occurs in the reverse switch 16, and controls the engine starting/stopping means 7 so as to hold the engine 5 at a drive state and controls the PTO solenoid 25 so as to shift the mid PTO clutch 24 to the interruption state (step S109). Namely, the mid PTO clutch 24 is shifted to "disengagement" while the engine 5 is not stopped.

When it can be detected at least once that the input voltage from the first contact 31 is not higher than the set voltage, that is, the detection voltage of the first connection part 33 is 0V for example (step S101, Yes), the control device 40 judges subsequently whether an input voltage from the second contact 32 is not higher than a set voltage or not, that is, a detection voltage of the second connection part 34 is detected to be a predetermined voltage (for example, 12V) or not until the predetermined abnormality detection time from turning ON of the power switch 11 (step S102). Until the predetermined abnormality detection time, when the detection voltage of the second connection part 34 is continuously 0V for example, the control device 40 judges that abnormality occurs in the reverse switch 16, and controls the engine starting/stopping means 7 so as to hold the engine 5 at the drive state and controls the PTO solenoid 25 so as to shift the mid PTO clutch 24 to the interruption state (step S109). Namely, the mid PTO clutch 24 is shifted to "disengagement" while the engine 5 is not stopped.

When the abnormality of the reverse switch 16 is not detected until the predetermined abnormality detection time (step S102, Yes), the control device 40 subsequently judges whether the vehicle operation instrument 15 is operated to the rearward traveling side or not. Concretely, when the input voltage from the first contact 31 is higher than the set voltage, that is, the detection voltage of the first connection part 33 is the predetermined voltage, the control device 40 judges that the vehicle operation instrument 15 is operated and shifts to the step S104. On the other hand, when the input voltage from the first contact 31 is not higher than the set voltage, that is, any voltage is not applied to the first connection part 33, the control device 40 shifts to the step S107.

When the vehicle operation instrument 15 is operated to the rearward traveling side (step S103, Yes), the control device 40 subsequently judges whether the mid PTO switch 12 and the overriding switch 14 are respectively turned ON or not (steps S104, S105). When the mid PTO switch 12 is turned OFF (step S104, No), the control device 40 controls the engine starting/stopping means 7 so as to hold the engine 5 at the drive state and controls the PTO solenoid 25 so as to shift the mid PTO clutch 24 to the interruption state (step S110). Namely, when operation of the vehicle operation instrument 15 to the rearward traveling side is detected, in principle, the mid PTO clutch 24 is shifted to "disengagement" while the engine 5 is not stopped so as to prevent drive of the mid PTO shaft 22 at the time of rearward traveling.

When the mid PTO switch 12 is turned ON and the overriding switch 14 is turned OFF (step S105, No), the control device 40 subsequently judges whether the rear PTO switch 13 is turned OFF or not (step S106).

When the rear PTO switch 13 is turned ON (step S106, No), the control device 40 controls the engine starting/stopping means 7 so as to hold the engine 5 at the drive state and controls the PTO solenoid 25 so as to shift the mid PTO clutch 24 to the interruption state (step S111). Namely, it is judged that a user desires to drive the rear PTO shaft 21 at the time of rearward traveling of the vehicle body 2, and the drive state of the engine 5 is held and the mid PTO clutch 24 is shifted to "disengagement" so as not to drive the mid PTO shaft 22.

When the rear PTO switch 13 is turned OFF (step S106, Yes), the control device 40 controls the engine starting/stopping means 7 so as to stop the engine 5 and controls the PTO solenoid 25 so as to shift the mid PTO clutch 24 to the interruption state (step S112). Namely, it is judged to stop the work because the mid PTO switch 12 is turned ON though a user does not desire to drive the rear PTO shaft 21 at the time of rearward traveling of the vehicle body 2, whereby the engine 5 is stopped.

When the mid PTO switch 12 is turned ON and the overriding switch 14 is turned ON (step S105, Yes), the control device 40 controls the engine starting/stopping means 7 so as to hold the engine 5 at the drive state and controls the PTO solenoid 25 so as to shift the mid PTO clutch 24 to the transmission state (step S113). Namely, it is judged that a user desires to drive the mid PTO shaft 22 at the time of rearward traveling of the vehicle body 2, and the drive state of the engine 5 is held and the mid PTO clutch 24 is shifted to "engagement" so as to drive exceptionally the mid PTO shaft 22 at the time of rearward traveling and the overriding lamp 18 is switched on.

At the step S107, the control device 40 judges whether the input voltage from the second contact 32 is higher than the set voltage or not, that is, the detection voltage of the second connection part 34 is the predetermined voltage or not. When the input voltage from the second contact 32 is not higher than the set voltage, that is, when any voltage is not applied to the second connection part 34 (step S107, No), the control device 40 judges that the coupler 35 of the reverse switch 16 is removed or wiring connecting the reverse switch 16 to the control device 40 is broken, and controls the engine starting/stopping means 7 so as to hold the engine 5 at the drive state and controls the PTO solenoid 25 so as to shift the mid PTO clutch 24 to the interruption state (step S114). Namely, the mid PTO clutch 24 is shifted to "disengagement" while the engine 5 is not stopped.

When the input voltage from the second contact 32 is higher than the set voltage, that is, when the detection voltage of the second connection part 34 is the predetermined voltage (for example, 12V) (step S107, Yes), the control device 40 judges subsequently whether the mid PTO switch 12 is turned ON or not (step S108). When the mid PTO switch 12 is turned ON (step S108, Yes), the control device 40 judges that a user desires to drive the mid PTO shaft 22 at the time of forward traveling of the vehicle body 2, and controls the engine starting/stopping means 7 so as to hold the engine 5 at the drive state and controls the PTO solenoid 25 so as to shift the mid PTO clutch 24 to the transmission state (step S115). On the other hand, when the mid PTO switch 12 is turned OFF (step S108, No), the control device 40 controls the engine starting/stopping means 7 so as to hold the engine 5 at the drive state and controls the PTO solenoid 25 so as to shift the mid PTO clutch 24 to the interruption state (step S114).

Figure 6A:
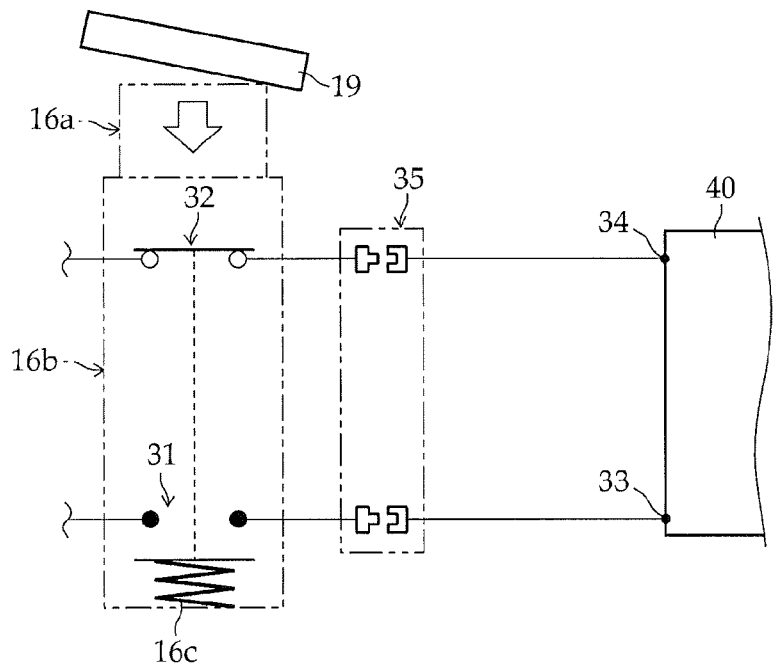
FIGS. 6A and 6B is a drawing of a state at which a coupler of the reverse switch is removed.

As explained above, the tractor 1 according to this embodiment has the PTO solenoid 25 switching transmission and interruption of the mid PTO clutch 24 and the reverse switch 16 detecting the rearward traveling operation. The reverse switch 16 has the first contact 31 which is normally closed type and the second contact 32 which is normally opened type and switched interlockingly with the first contact 31. These contacts are connected to the control device 40 so that the first contact 31 is closed and the second contact 32 is opened while the vehicle operation instrument 15 is operated to the rearward traveling side (see FIG. 4B) and the first contact 31 is opened and the second contact 32 is closed while the vehicle operation instrument 15 is not operated to the rearward traveling side (see FIG. 4B). When the input voltage from the first contact 31 is higher than the set voltage (see FIG. 4B), or when the input voltage from the first contact 31 is not higher than the set voltage and the input voltage from the second contact 32 is not higher than the set voltage (see FIG. 6A), the control device 40 controls the PTO solenoid 25 so as to shift the mid PTO clutch 24 to the interruption state (see steps S110 and S114 in FIG. 5).

According to the configuration, when the operation of the vehicle operation instrument 15 to the rearward traveling side is detected (see FIG. 4B), when the coupler 35 connecting the reverse switch 16 to the control device 40 is removed (see FIG. 6A), or when the wiring connecting the reverse switch 16 to the control device 40 is broken, the mid PTO clutch 24 can be shifted to the interruption state (see steps S110 and S114 in FIG. 5). Accordingly, at the time of rearward traveling of the vehicle body 2, or at the time of abnormality of the reverse switch 16, the drive of the mid PTO shaft 22 can be prevented certainly, whereby reliability of the reverse switch 16 can be improved. Safety can be improved.

The tractor 1 according to this embodiment further has the mid PTO switch 12 selecting the transmission state or the interruption state of the mid PTO clutch 24, and the overriding switch 14 turned ON by a user for enabling drive of the mid PTO shaft 22 at the time of rearward traveling. When the input voltage from the first contact 31 is higher than the set voltage and both the mid PTO switch 12 and the overriding switch 14 are turned ON (see FIG. 3C), the control device 40 controls the PTO solenoid 25 so as to shift the mid PTO clutch 24 to the transmission state (see step S113 in FIG. 5).

According to the configuration, only when the mid PTO switch 12 is turned ON and the overriding switch 14 is turned ON, the mid PTO shaft 22 can be driven at the time of rearward traveling of the vehicle body 2, whereby safety can be improved.

Furthermore, in the tractor 1 according to this embodiment, the mid PTO switch 12 and the overriding switch 14 are configured integrally. According to the configuration, number of parts can be reduced and operation of a user can be simplified.

In the tractor 1 according to this embodiment, when the input voltage from the first contact 31 is not detected to be not higher than the set voltage until the predetermined abnormality detection time (in this embodiment, 20 seconds) from turning ON of the power switch 11, or when the input voltage from the second contact 32 is not detected to be higher than the set voltage until the predetermined abnormality detection time from turning ON of the power switch 11, the control device 40 judges that abnormality occurs in the reverse switch 16, and controls the PTO solenoid 25 so as to shift the mid PTO clutch 24 to the interruption state (see step S109 in FIG. 5).

Figure 6B:
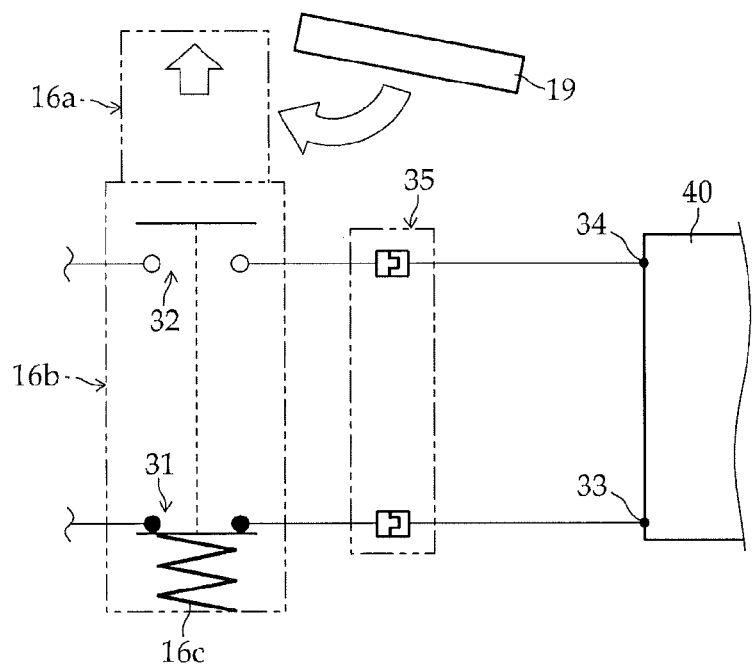

According to the configuration, when a user drops the reverse switch 16 from the attachment frame (see FIG. 6B) or removes the coupler 35 connecting the reverse switch 16 to the control device 40 (see FIG. 6A) so as to avoid intentionally detection of the rearward traveling by the reverse switch 16, the mid PTO clutch 24 is shifted to the interruption state. Accordingly, when abnormality occurs in the reverse switch 16, the drive of the mid PTO shaft 22 can be prevented certainly, whereby reliability of the reverse switch 16 can be improved.

Concretely, when a user turns the power switch 11 ON while the coupler 35 of the reverse switch 16 is not removed and the reverse switch 16 is dropped from the attachment frame (see FIG. 6B), for example, the detection voltage of the first connection part 33 is held to be the predetermined voltage and the detection voltage of the second connection part 34 is held to be 0V, whereby the mid PTO clutch 24 is shifted to the interruption state (see step S109 in FIG. 5).

When a user turns the power switch 11 ON while the coupler 35 of the reverse switch 16 is removed (see FIG. 6A), for example, the detection voltage of the second connection part 34 is held to be 0V (step S102 in FIG. 5, Yes), whereby the mid PTO clutch 24 is shifted to the interruption state (see step S109 in FIG. 5).

Accordingly, when abnormality occurs in the reverse switch 16, the drive of the mid PTO shaft 22 can be prevented certainly, whereby reliability of the reverse switch 16 can be improved.

In the tractor 1 according to this embodiment, when abnormality is judged to occur in the reverse switch 16, the power switch 11 is turned OFF once and turned ON again. After the turning ON of the power switch 11 for the predetermined abnormality detection time, only when the input voltage from the first contact 31 is detected to be not higher than the set voltage and the input voltage from the second contact 32 is detected to be higher than the set voltage, the mid PTO clutch 24 can be shifted to the interruption state after the predetermined abnormality detection time. Namely, without turning off once and restarting the power switch 11, the interruption state of the mid PTO clutch 24 cannot be canceled.

According to the configuration, when abnormality occurs in the reverse switch 16, a user can be urged to stop the engine 5 once so as to correct the abnormality of the reverse switch 16.

Though the "PTO shaft" is the mid PTO shaft 22 in this embodiment, the present invention is not limited thereto and the "PTO shaft" may alternatively be the rear PTO shaft 21. The "PTO shaft" may alternatively be a front PTO shaft.

Though the "working vehicle" is the agricultural tractor 1 in this embodiment, the present invention is not limited thereto and another working vehicle having a PTO shaft such as a construction tractor may alternatively be used.

Next, a second embodiment of the agricultural tractor 1 which is the example of the working vehicle is explained.

Figure 7:
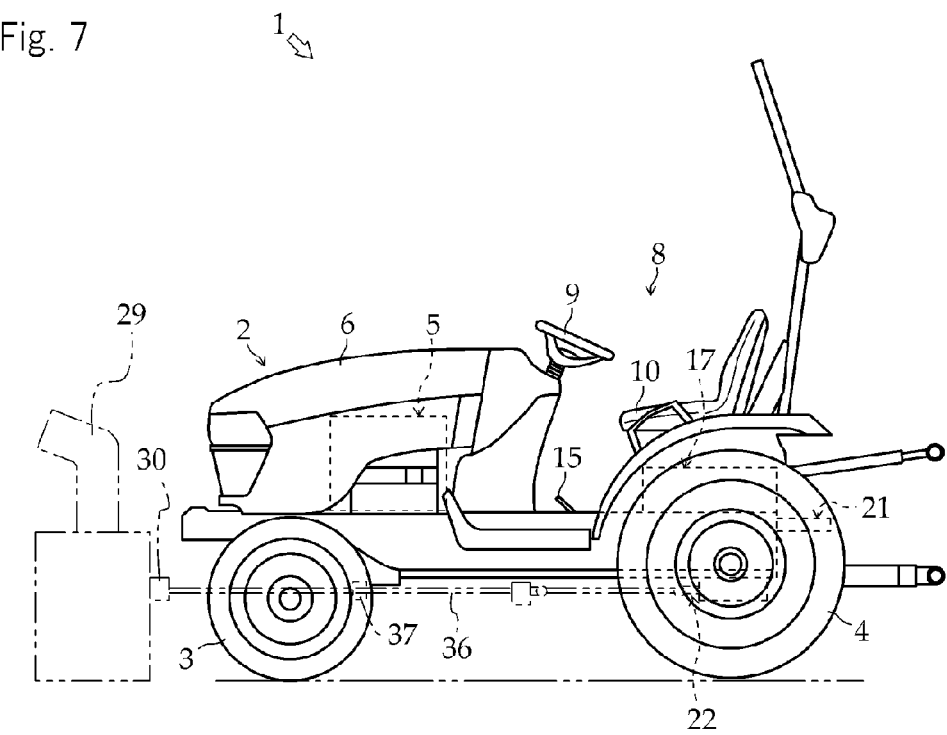
FIG. 7 is a left side view of the agricultural tractor which is equipped with a front working machine.

As shown in FIG. 1 or 7, a mid working machine (for example, the mower working machine 23) can be attached between the front wheels 3 and the rear wheels 4, and a front working machine (for example, a snowplow 29) can be attached to the front part of the vehicle body 2.

As shown in FIG. 1, a gearbox 27 is arranged in an upper part of the mower working machine 23. The mower working machine 23 is connected via a transmission shaft 28 to the mid PTO shaft 22. By connecting the transmission shaft 28 to the gearbox 27, the mower working machine 23 is connected to the mid PTO shaft 22.

As shown in FIG. 7, a gearbox 30 is arranged in a rear part of the snowplow 29. The snowplow 29 is connected via a shaft (hexagonal shaft) 36 to the mid PTO shaft 22. By connecting the shaft 36 to the gearbox 30, the snowplow 29 is connected to the mid PTO shaft 22.

The front working machine (the snowplow 29) or the mid working machine (the mower working machine 23) can be connected alternatively to the mid PTO shaft 22 (the gearbox 27).

As shown in FIG. 7, a rotation sensor 37 is provided in a lower part of the vehicle body 2. The rotation sensor 37 detects whether the front working machine (the snowplow 29) is connected to the mid PTO shaft 22 or not. The rotation sensor 37 is arranged so as to be positioned near the shaft 36 when the snowplow 29 is connected via the shaft 36 to the mid PTO shaft 22. The rotation sensor 37 detects a rotation pulse of the shaft 36 so as to detect rotation of the shaft 36. The rotation sensor 37 is connected electrically to the control device 40 (see FIG. 2).

The boss PTO switch 26 is an operation means for selecting artificially states of the mid PTO clutch 24 and the rear PTO clutch to the transmission state or the interruption state. The boss PTO switch 26 is connected electrically to the control device 40. An ON state of the boss PTO switch 26 corresponds to the transmission state ("engagement") of the mid PTO clutch 24 and the rear PTO clutch, and an OFF state thereof corresponds to the interruption state ("disengagement") of the mid PTO clutch 24 and the rear PTO clutch.

The control device 40 judges whether the front working machine (the snowplow 29) is connected to the mid PTO shaft 22 or not based on detection results of the rotation sensor 37. In detail, in the case in which information that a rotation speed of the shaft 36 is within a predetermined range is received from the rotation sensor 37 for a predetermined period, the control device 40 judges that the front working machine is connected to the mid PTO shaft 22, and in the other case, the control device 40 judges that the front working machine is not connected to the mid PTO shaft 22. The predetermined range and the predetermined period are determined suitably in consideration of the minimum rotation speed and the maximum rotation speed of the mid PTO shaft 22 and the like.

Accordingly, in the tractor 1, requirements for the control device 40 to judge whether the front working machine is connected to the mid PTO shaft 22 or not are made strict, whereby the control device 40 can judge accurately whether the front working machine is connected to the mid PTO shaft 22 or not.

The control device 40 judges whether the vehicle operation instrument 15 is operated to the forward traveling side, the rearward traveling side or the neutral position based on detection results of the potentiometer 38. It may alternatively be configured that a known back switch is provided in the vehicle operation instrument 15 and the control device 40 judges whether the vehicle operation instrument 15 is operated to the rearward traveling side or not based on detection results of the back switch.

Figure 8:
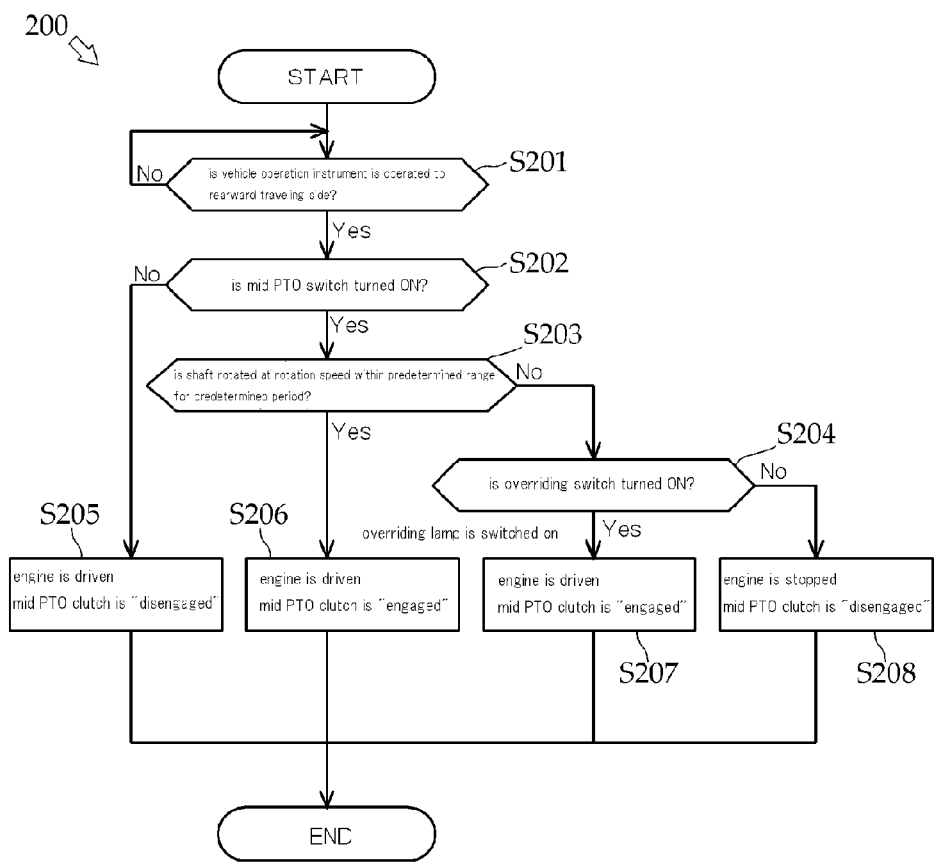
FIG. 8 is a flow chart of a control flow.

A control flow 200 executed by the control device 40 is explained referring to FIG. 8. As shown in FIG. 8, the control flow 200 is configured by steps S201 to S208.

When the power switch 11 is turned ON and the engine 5 is started, the control device 40 starts the control flow 200 (START).

The control device 40 judges whether the vehicle operation instrument 15 is operated to the rearward traveling side or not (step S201).

When the vehicle operation instrument 15 is judged to be operated to the rearward traveling side (a signal for making the vehicle body 2 travel rearward (rearward traveling signal of the vehicle body 2) is received) (step S201, Yes), the control device 40 judges subsequently whether the mid PTO switch 12 is turned ON or not (step S202).

When the mid PTO switch 12 is turned OFF (step S202, No), the control device 40 controls the engine starting/stopping means 7 so as to hold the engine 5 at the drive state and controls the PTO solenoid 25 so as to shift the mid PTO clutch 24 to the interruption state (step S205). Namely, when the rearward operation of the vehicle operation instrument 15 is detected (the rearward traveling signal of the vehicle body 2 is received), in principle, the mid PTO clutch 24 is shifted to "disengagement" while the engine 5 is not stopped so as to prevent drive of the mid PTO shaft 22 at the time of rearward traveling.

When the mid PTO switch 12 is turned ON (step S202, Yes), the control device 40 judges whether the front working machine (the snowplow 29) is connected to the mid PTO shaft 22 or not (step S203). In detail, the control device 40 judges whether information that the rotation speed of the shaft 36 is within the predetermined range is received from the rotation sensor 37 for the predetermined period or not.

When the front working machine is judged to be connected to the mid PTO shaft 22 (step S203, Yes), the control device 40 controls the engine starting/stopping means 7 so as to hold the engine 5 at the drive state and controls the PTO solenoid 25 so as to shift the mid PTO clutch 24 to the transmission state (step S206). In this case, regardless of whether the overriding switch 14 is turned ON or OFF, the control device 40 holds the engine 5 at the drive state and holds the mid PTO clutch 24 at the transmission state. Namely, it is judged that a user desires to drive the mid PTO shaft 22 at the time of rearward traveling of the vehicle body 2, and the drive state of the engine 5 is held and the mid PTO clutch 24 is shifted to "engagement" so as to drive exceptionally the mid PTO shaft 22 at the time of rearward traveling.

Accordingly, in the tractor 1, in the case in which the mower working machine 23 is not connected to the mid PTO shaft 22 and the snowplow 29 is connected thereto, when an user operates the vehicle operation instrument 15 to the rearward traveling side while forgetting to turn the overriding switch 14 ON, the engine 5 can be prevented from being stopped and the transmission state of the mid PTO clutch 24 can be maintained. Accordingly, workability can be improved.

When the front working machine is judged not to be connected to the mid PTO shaft 22 (step S203, No), the control device 40 judges whether the overriding switch 14 is turned ON or not (step S204).

When the overriding switch 14 is turned ON (step S204, Yes), the control device 40 controls the engine starting/stopping means 7 so as to hold the engine 5 at the drive state and controls the PTO solenoid 25 so as to shift the mid PTO clutch 24 to the transmission state (step S207). Namely, it is judged that a user desires to drive the mid PTO shaft 22 at the time of rearward traveling of the vehicle body 2, and the drive state of the engine 5 is held and the mid PTO clutch 24 is shifted to "engagement" so as to drive exceptionally the mid PTO shaft 22 at the time of rearward traveling and the overriding lamp 18 is switched on.

When the overriding switch 14 is turned OFF (step S204, No), the control device 40 controls the engine starting/stopping means 7 so as to stop the engine 5 and controls the PTO solenoid 25 so as to shift the mid PTO clutch 24 to the interruption state (step S208). In this case, the control device 40 may alternatively control the engine starting/stopping means 7 so as to hold the engine 5 at the drive state and control the PTO solenoid 25 so as to shift the mid PTO clutch 24 to the interruption state.

In the case in which the vehicle operation instrument 15 is operated to the rearward traveling side of the vehicle body 2 while the engine 5 is driven and the boss PTO switch 26 is turned ON (the mid PTO clutch 24 and the rear PTO clutch are at the transmission state), when the front working machine is judged to be connected to the mid PTO shaft 22 based on the detection results of the rotation sensor 37, the control device 40 may maintain the drive of the engine 5 and the transmission state of the mid PTO clutch 24 and the rear PTO clutch.

In the case in which the vehicle operation instrument 15 is operated to the rearward traveling side of the vehicle body 2 while the engine 5 is driven and the boss PTO switch 26 is turned ON (the mid PTO clutch 24 and the rear PTO clutch are at the transmission state), when the front working machine is judged not to be connected to the mid PTO shaft 22 based on the detection results of the rotation sensor 37 and the overriding switch 14 is turned ON, the control device 40 may maintain the drive of the engine 5 and the transmission state of the mid PTO clutch 24 and the rear PTO clutch, and when the overriding switch 14 is turned OFF, the control device 40 may shift the mid PTO clutch 24 and the rear PTO clutch to the interruption state.

Though the "working vehicle" is the agricultural tractor 1 in this embodiment, the present invention is not limited thereto and another working vehicle which can be equipped with a working machine such as a construction tractor may alternatively be used.

As the above, the tractor 1 has the mid PTO shaft 22 which can be connected alternatively to the front working machine or the mid working machine, the rotation sensor 37 detecting whether the front working machine is connected to the mid PTO shaft 22 or not, and the control device 40 maintaining the drive of the engine 5 and the transmission state of the mid PTO clutch 24 when the front working machine is judged not to be connected to the mid PTO shaft 22 based on the detection results of the rotation sensor 37 in the case in which the rearward traveling signal of the vehicle body 2 is received (the vehicle operation instrument 15 is operated to the rearward traveling side of the vehicle body 2) while the engine 5 is driven and the mid PTO clutch 24 of the mid PTO shaft 22 is at the transmission state.

Accordingly, when the mid working machine is not connected to the mid PTO shaft 22 and the front working machine is connected thereto, when an user operates the vehicle operation instrument 15 to the rearward traveling side while forgetting to turn the overriding switch 14 ON, the engine 5 can be prevented from being stopped and the transmission state of the mid PTO clutch 24 can be maintained. Accordingly, workability can be improved.

In the tractor 1, the front working machine can be connected via the shaft 36 to the mid PTO shaft 22, the rotation sensor 37 detects the rotation of the shaft 36 connected to the mid PTO shaft 22, and in the case in which information that the rotation speed of the shaft 36 is within the predetermined range is received from the rotation sensor 37 for the predetermined period, the control device 40 judges that the front working machine is connected to the mid PTO shaft 22, and in the other case, the control device 40 judges that the front working machine is not connected to the mid PTO shaft 22.

Accordingly, the control device 40 can judge accurately whether the front working machine is connected to the mid PTO shaft 22 or not.

The tractor 1 has the overriding switch 14, and in the case in which the front working machine is judged not to be connected to the mid PTO shaft 22 based on the detection results of the rotation sensor 37 at the state at which the rearward traveling signal of the vehicle body 2 is received (the vehicle operation instrument 15 is operated to the rearward traveling side of the vehicle body 2) while the engine 5 is driven and the mid PTO clutch 24 is at the transmission state, when the overriding switch 14 is turned ON, the control device 40 maintains the drive of the engine 5 and the transmission state of the mid PTO clutch 24, and when the overriding switch 14 is turned OFF, the control device 40 shifts the mid PTO clutch 24 to the interruption state.

Accordingly, by turning ON the overriding switch 14, the vehicle body 2 can travel rearward while the mid working machine is driven.

Next, a third embodiment of the agricultural tractor 1 which is the example of the working vehicle is explained.

As shown in FIG. 1, the front wheels 3 and the rear wheels 4 are arranged respectively at the front and rear parts of the vehicle body 2 of the tractor 1. In the front part of the vehicle body 2, the engine (diesel engine) 5 which is the power source of the tractor 1 is mounted, and the engine 5 is covered by the bonnet 6.

As shown in FIG. 2, the engine starting/stopping means 7 includes a supply means 39 having a fuel supply valve, a solenoid and an injector. In the supply means 39, by opening and closing the fuel supply valve, which is provided in the fuel supply passage, by the solenoid, supply (injection) and stop of the supply of fuel from the injector to cylinders of the engine 5 is performed.

The control device 40 judges whether the vehicle operation instrument 15 is operated to the forward traveling side, the rearward traveling side or the neutral position based on detection results of the potentiometer 38. It may alternatively be configured that a known back switch is provided in the vehicle operation instrument 15 and the control device 40 judges whether the vehicle operation instrument 15 is operated to the rearward traveling side or not based on detection results of the back switch.

Figure 9:
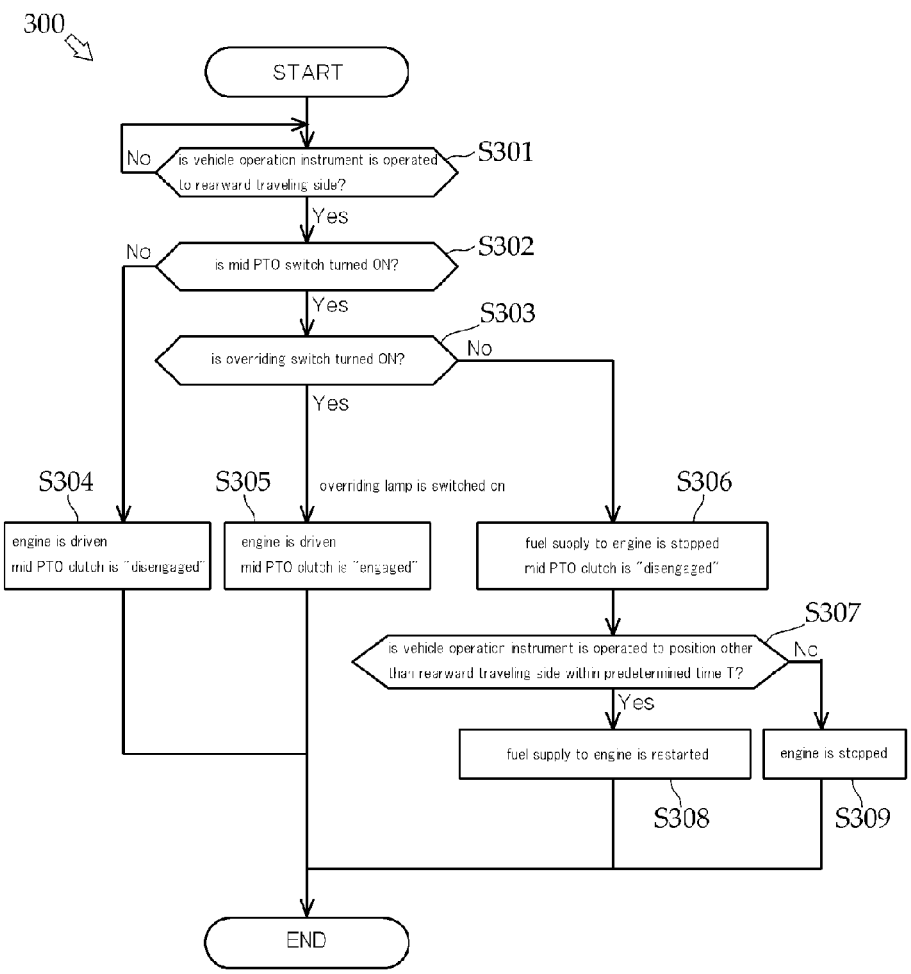
FIG. 9 is a flow chart of a control flow.

A control flow 300 executed by the control device 40 is explained referring to FIG. 9. As shown in FIG. 9, the control flow 300 is configured by steps S301 to S308.

When the power switch 11 is turned ON and the engine 5 is started, the control device 40 starts the control flow 300 (START).

The control device 40 judges whether the vehicle operation instrument 15 is operated to the rearward traveling side or not (step S301).

When the vehicle operation instrument 15 is judged to be operated to the rearward traveling side (a signal for making the vehicle body 2 travel rearward (rearward traveling signal of the vehicle body 2) is received) (step S301, Yes), the control device 40 judges subsequently whether the mid PTO switch 12 is turned ON or not (step S302).

When the mid PTO switch 12 is turned OFF (step S302, No), the control device 40 controls the engine starting/stopping means 7 so as to hold the engine 5 at the drive state and controls the PTO solenoid 25 so as to shift the mid PTO clutch 24 to the interruption state (step S304). Namely, when the rearward operation of the vehicle operation instrument 15 is detected (the rearward traveling signal of the vehicle body 2 is received), in principle, the mid PTO clutch 24 is shifted to "disengagement" while the engine 5 is not stopped so as to prevent drive of the mid PTO shaft 22 at the time of rearward traveling.

When the mid PTO switch 12 is turned ON (step S302, Yes), the control device 40 judges subsequently whether the overriding switch 14 is turned ON or not (S303).

When the overriding switch 14 is turned ON (step S303, Yes), the control device 40 controls the engine starting/stopping means 7 so as to hold the engine 5 at the drive state and controls the PTO solenoid 25 so as to shift the mid PTO clutch 24 to the transmission state (step S305). Namely, it is judged that a user desires to drive the mid PTO shaft 22 at the time of rearward traveling of the vehicle body 2, and the drive state of the engine 5 is held and the mid PTO clutch 24 is shifted to "engagement" so as to drive exceptionally the mid PTO shaft 22 at the time of rearward traveling and the overriding lamp 18 is switched on.

When the overriding switch 14 is turned OFF (step S303, No), the control device 40 controls the engine starting/stopping means 7 so as to stop the engine 5. Namely, the control device 40 operates the solenoid so as to stop supply of fuel to the engine 5 by the supply means 39. Furthermore, the control device 40 controls the PTO solenoid 25 so as to shift the mid PTO clutch 24 to the interruption state (step S306). Accordingly, the mid PTO clutch 24 is shifted to the interruption state while the mid PTO switch 12 is turned ON.

The control device 40 judges whether the vehicle operation instrument 15 is operated to a position other than the rearward traveling side (the neutral position or the forward traveling side) after the stop of supply of fuel to the engine 5 by the supply means 39 (step S306) for a predetermined time T (step S307).

The predetermined time T is a period in which after the stop of supply of fuel to the engine 5, the fuel is supplied to the engine 5 driven inertially (the engine 5 not stopped completely) so as to return the engine 5 to the drive state, that is, to restart inhalation, compression, combustion and exhaust processes, and is determined suitably by an experiment or the like.

When the vehicle operation instrument 15 is operated to the neutral position or the forward traveling side until the predetermined time T (step S307, Yes), the control device 40 restarts the supply of fuel to the engine 5 by the supply means 39 until the predetermined time T (step S308). In detail, the fuel supply valve is opened by the solenoid and the supply of fuel from the injector to the cylinders of the engine 5 is restarted. As a result, the engine 5 is returned to the drive state by only the operation of the vehicle operation instrument 15 without the operation of the power switch 11.

Accordingly, even if a user makes the vehicle body 2 travel rearward by wrong operation while the mid PTO switch 12 is turned ON and the overriding switch 14 is turned OFF, by operating the vehicle operation instrument 15 so as to shift the vehicle body 2 to the state other than the rearward traveling until the predetermined time T, the engine 5 can be prevented from being stopped so as to continue the work. Accordingly, operability can be improved.

When the vehicle operation instrument 15 is operated to the neutral position or the forward traveling side until the predetermined time T, that is, the operation of the vehicle operation instrument 15 to the rearward traveling side is continued (step S307, No), the control device 40 does not restart the supply of fuel to the engine 5 by the supply means 39. As a result, the engine 5 is stopped completely (step S309).

At the step S306, when the mid PTO switch 12 is turned ON and the mid PTO clutch 24 is shifted to the interruption state and then a user turns the mid PTO switch 12 OFF and ON in this order, the control device 40 shifts the mid PTO clutch 24 to the transmission state. Until the operation of the mid PTO switch 12 (OFF to ON) is performed, the control device 40 maintains the interruption state of the mid PTO clutch 24.

Accordingly, in the tractor 1, by requiring operation for shifting the mid PTO clutch 24 to the transmission state of a user, wrong operation of the mid working machine by the user can be suppressed.

Figure 10:
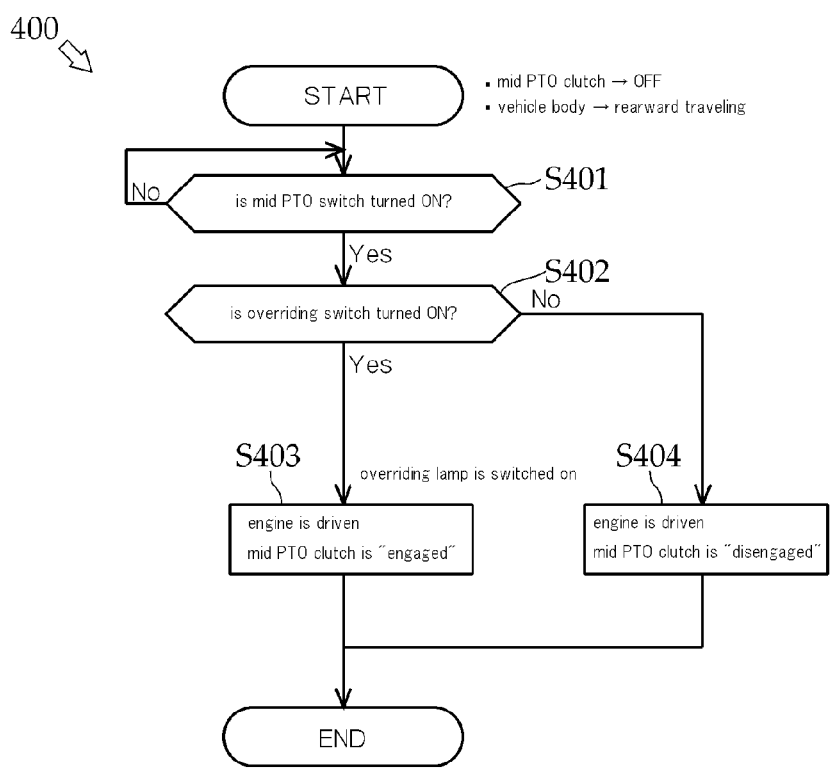
FIG. 10 is a flow chart of a control flow.

A control flow 400 executed by the control device 40 is explained referring to FIG. 10. As shown in FIG. 10, the control flow 400 is configured by steps S401 to S404.

When the power switch 11 is turned ON and the engine 5 is started, the mid PTO switch 12 is turned OFF (the mid PTO clutch 24 is shifted to the interruption state), and the vehicle operation instrument 15 is operated to the rearward traveling side (the rearward traveling signal of the vehicle body 2 is received), the control device 40 starts the control flow 400 (START).

The control device 40 judges whether the mid PTO switch 12 is turned ON or not (step S401).

When the mid PTO switch 12 is turned ON (step S401, Yes), the control device 40 judges whether the overriding switch 14 is turned ON or not (step S402).

When the overriding switch 14 is turned ON (step S402, Yes), the control device 40 controls the engine starting/stopping means 7 so as to hold the engine 5 at the drive state and controls the PTO solenoid 25 so as to shift the mid PTO clutch 24 to the transmission state (step S403). Namely, it is judged that a user desires to drive the mid PTO shaft 22 at the time of rearward traveling of the vehicle body 2, and the drive state of the engine 5 is held and the mid PTO clutch 24 is shifted to "engagement" so as to drive exceptionally the mid PTO shaft 22 at the time of rearward traveling and the overriding lamp 18 is switched on.

When the overriding switch 14 is turned OFF (step S402, No), the control device 40 controls the engine starting/stopping means 7 so as to hold the engine 5 at the drive state (continues the supply of fuel to the engine 5) and cancels the turning ON operation of the mid PTO switch 12 so as to continue the interruption state of the mid PTO clutch 24 (step S404). Namely, it is judged that a user does not desire to stop the engine 5, and the mid PTO clutch 24 is shifted to "disengagement" while the drive state of the engine 5 is held. Accordingly, the mid PTO clutch 24 is shifted to "disengagement" while the mid PTO switch 12 is turned ON.

Accordingly, when the mid PTO switch 12 is turned ON, the overriding switch 14 is turned OFF and the vehicle body 2 travels rearward, even if a user turns the mid PTO switch 12 ON by wrong operation, the engine 5 can be prevented from being stopped so as to continue the work. Accordingly, operability can be improved.

At the step 404, in the case in which the mid PTO switch 12 is turned ON and the interruption state of the mid PTO clutch 24, when a user operates the vehicle operation instrument 15 to the neutral position or the forward traveling side and turns the mid PTO switch 12 OFF and ON in this order, the control device 40 shifts the mid PTO clutch 24 to the transmission state. At this state, by turning the overriding switch 14 ON, the user can make the vehicle body 2 travel rearward while maintaining the transmission state of the mid PTO clutch 24 (while driving the mower working machine 23).

Though the "working vehicle" is the agricultural tractor 1 in this embodiment, the present invention is not limited thereto and another working vehicle which can be equipped with a working machine such as a construction tractor may alternatively be used.

As the above, the tractor 1 has the mid PTO switch 12 which is turned ON so as to shift the mid PTO clutch 24 to the transmission state and turned OFF so as to shift the mid PTO clutch 24 to the interruption state, the supply means 39 supplying fuel to the engine 5, the overriding switch 14, and the control device 40 stopping the supply of fuel to the engine 5 by the supply means 39 when the rearward traveling signal of the vehicle body 2 is received (the vehicle operation instrument 15 is operated so as to make the vehicle body 2 travel rearward) in the case in which the engine 5 is driven, the mid PTO switch 12 is turned ON and the overriding switch 14 is turned OFF and subsequently restarting the supply of fuel to the engine 5 by the supply means 39 when the rearward traveling signal is stopped (the vehicle operation instrument 15 is operated so as to shift the vehicle body 2 from the rearward traveling state to the other state) until the predetermined time T.

Accordingly, in the case in which the mid PTO switch 12 is turned ON and the overriding switch 14 is turned OFF, when a user makes the vehicle body 2 travel rearward by wrong operation, by operating the vehicle operation instrument 15 so as to shift the vehicle body 2 to the state other than the rearward traveling state until the predetermined time T, the engine 5 can be prevented from being stopped so as to continue the work. Accordingly, operability can be improved.

In the tractor 1, in the case in which the engine 5 is driven, the mid PTO switch 12 is turned ON and the overriding switch 14 is turned OFF, when the rearward traveling signal is received (the vehicle operation instrument 15 is operated so as to make the vehicle body 2 travel rearward), the control device 40 shifts the mid PTO clutch 24 to the interruption state while turning the mid PTO switch 12 ON and maintains the interruption state of the mid PTO clutch 24 until the mid PTO switch 12 is turned OFF and ON.

Accordingly, wrong operation of the mid working machine by the user can be suppressed.

In the tractor 1, in the case in which the engine 5 is driven, the mid PTO switch 12 is turned OFF and the overriding switch 14 is turned OFF, when the rearward traveling signal is received (the vehicle operation instrument 15 is operated so as to make the vehicle body 2 travel rearward) and the mid PTO switch 12 is turned ON, the control device 40 maintains the drive of the engine 5 and the interruption state of the mid PTO clutch 24.

Accordingly, when the mid PTO switch 12 is turned ON, the overriding switch 14 is turned OFF and the vehicle body 2 travels rearward, even if a user turns the mid PTO switch 12 ON by wrong operation, the engine 5 can be prevented from being stopped so as to continue the work. Accordingly, operability can be improved.

INDUSTRIAL APPLICABILITY

The present invention can be used for a working vehicle such as a tractor.

The invention claimed is:

1. A working vehicle comprising:
an actuator which switches a transmission state and an interruption state of a power-take off ("PTO") clutch; and
a reverse switch detecting rearward traveling operation, characterized in that
the reverse switch has a first contact which is normally closed type and a second contact which is normally opened type and switched interlockingly with the first contact, and these contacts are connected to a control device so that the first contact is closed and the second contact is opened while rearward traveling operation is performed and the first contact is opened and the second contact is closed while the rearward traveling operation is not performed, and
when an input voltage from the first contact is higher than a set voltage, or when the input voltage from the first contact is not higher than the set voltage and an input voltage from the second contact is not higher than the set voltage, the control device controls the actuator so as to shift the PTO clutch to the interruption state.

2. The working vehicle according to claim 1, further comprising:
a PTO switch selecting the transmission state or the interruption state of the PTO clutch; and
an overriding switch turned ON so as to enable drive of the PTO shaft at the time of rearward traveling,
wherein when the input voltage from the first contact is higher than the set voltage and both the PTO switch and the overriding switch are turned ON, the control device controls the actuator so as to shift the PTO clutch to the transmission state.

3. The working vehicle according to claim 1, wherein when the input voltage from the first contact is not detected to be not higher than the set voltage until a predetermined abnormality detection time from turning ON of a power switch, or when the input voltage from the second contact is not detected to be higher than the set voltage until the predetermined abnormality detection time from turning ON of the power switch, the control device judges that abnormality occurs in the reverse switch, and controls the actuator so as to shift the PTO clutch to the interruption state.

4. The working vehicle according to claim 3, wherein when the abnormality is judged to occur in the reverse switch, the power switch is turned OFF once and turned ON again, and after the turning ON of the power switch for the predetermined abnormality detection time, only when the input voltage from the first contact is detected to be not higher than the set voltage and the input voltage from the second contact is detected to be higher than the set voltage, the PTO clutch can be shifted to the transmission state after the predetermined abnormality detection time.

5. The working vehicle according to claim 2, wherein when the input voltage from the first contact is not detected to be not higher than the set voltage until a predetermined abnormality detection time from turning ON of a power switch, or when the input voltage from the second contact is not detected to be higher than the set voltage until the predetermined abnormality detection time from turning ON of the power switch, the control device judges that abnormality occurs in the reverse switch, and controls the actuator so as to shift the PTO clutch to the interruption state.

6. The working vehicle according to claim 4, wherein when the abnormality is judged to occur in the reverse switch, the power switch is turned OFF once and turned ON again, and after the turning ON of the power switch for the predetermined abnormality detection time, only when the input voltage from the first contact is detected to be not higher than the set voltage and the input voltage from the second contact is detected to be higher than the set voltage, the PTO clutch can be shifted to the transmission state after the predetermined abnormality detection time.

* * * * *